FIG. 1.

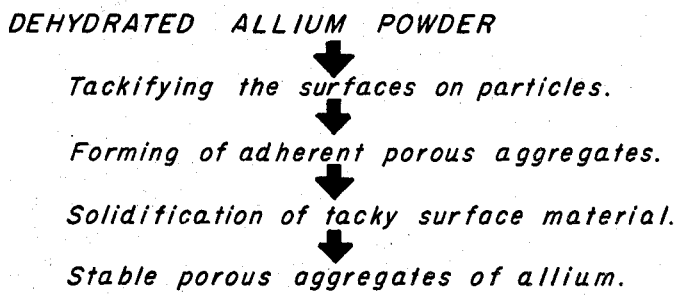

DEHYDRATED ALLIUM POWDER
↓
Tackifying the surfaces on particles.
↓
Forming of adherent porous aggregates.
↓
Solidification of tacky surface material.
↓
Stable porous aggregates of allium.

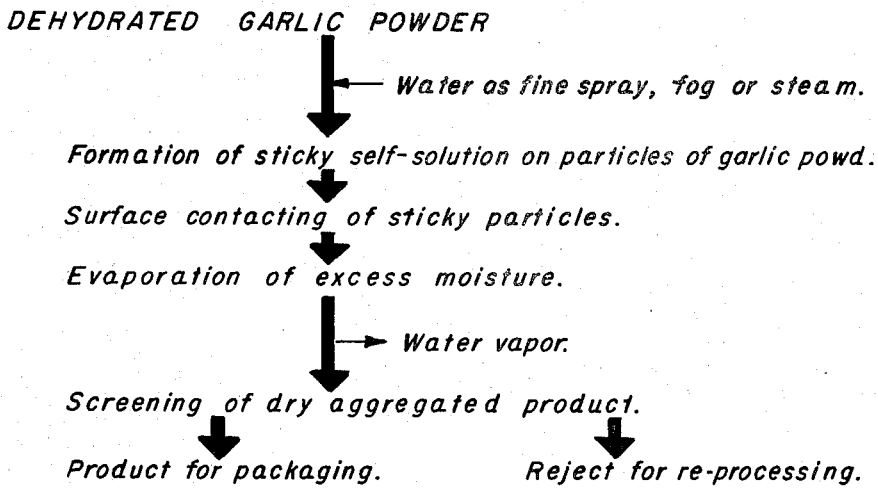

FIG. 2.

DEHYDRATED GARLIC POWDER
↓ ← Water as fine spray, fog or steam.
Formation of sticky self-solution on particles of garlic powd.
↓
Surface contacting of sticky particles.
↓
Evaporation of excess moisture.
↓ → Water vapor.
Screening of dry aggregated product.
↓                          ↓
Product for packaging.     Reject for re-processing.

INVENTORS
ARTHUR N. PRATER
ALBERT P. VOSTI
HORACE C. GORMLY
THOMAS M. LUKES
BY

ATTORNEY

Oct. 25, 1960

A. N. PRATER ET AL 2,957,771

AGGREGATED DEHYDRATED ALLIUM POWDER AND
PROCESS FOR MAKING THE SAME

Filed Nov. 17, 1958

INVENTORS
ARTHUR N. PRATER
ALBERT P. VOSTI
HORACE C. GORMLY
THOMAS M. LUKES
BY

ATTORNEY ns 2,957,771
Patented Oct. 25, 1960

2,957,771
AGGREGATED DEHYDRATED ALLIUM POWDER AND PROCESS FOR MAKING THE SAME

Arthur N. Prater, Sherman Oaks, and Albert P. Vosti, Horace C. Gormly, and Thomas M. Lukes, Gilroy, Calif., assignors to Gentry Division, Consolidated Foods Corporation, a corporation of Maryland Filed Nov. 17, 1958, Ser. No. 774,209

17 Claims. (Cl. 99—140)

This invention relates to a new porous aggregated form of dehydrated allium powder, and in particular to new porous aggregated forms of dehydrated garlic powder and dehydrated onion powder; and also to the method of making the same.

The principal object of the invention is to provide dehydrated allium powders in the form of permeable light weight aggregates or granules made up of agglomerated fine particles of one or more allium species. The genus "Allium" includes many bulbous plants, among which are the commercially important food flavoring species *sativum* (garlic), *cepa* (onion), *porrum* (leek), and *schoenoprasum* (chives).

Another object is to provide a process for agglomerating dehydrated allium powder particles without the addition of binders and without damage to or loss of flavoring strength. Another object is to provide loose porous allium flavoring granules having more uniform and stronger flavoring effects, having lower bulk density to facilitate even distribution in foods, and having minimum dusting properties, as during distribution into food batches. A further object is to provide uniformly blended powdered dehydrated allium as loose porous granules which present a uniform appearance and are uniform in flavoring strength throughout a large batch.

We have discovered that the indicated known defects in the dehydrated powdered allium products may be overcome by providing porous stable aggregates or granules of fine dehydrated allium powders. We have further discovered that the porous stable aggregates or granules of dehydrated allium powders may be prepared by a process which in general includes the essential steps of creating stickiness or tackiness on the particle surfaces and then contacting the particles (including slightly compressing them, or "snow-balling" by rolling or tumbling), the surface-sticky powder to form granules consisting of permeable aggregations of the powder. The surface tackiness or stickiness of the powdered allium materials may be produced either by heat softening, followed by cooling to ambient temperatures after the permeable agglomerations have been formed, or by a little moistening (by water, alcohol, glycol, etc.) of the powder surfaces with a solvent, followed by removal of the added solvent. Slight compaction, including the "snow-balling" by rolling or tumbling the sticky-surfaced powder, enhances the formation of the permeable aggregates.

The above stated and other objects are attained by our invention which will be better understood from the following description, reference being made to the accompanying drawings in which:

Fig. 1 is a flow sheet showing generally the steps of our process invention;

Fig. 2 is a flow sheet showing a preferred process for preparing aggregates of dehydrated garlic powder;

Fig. 3 is a diagrammatic side elevational view partly in section of a preferred form of apparatus for carrying out our invention;

Fig. 4 is a diagrammatic side elevational view partly in section of an alternative form of apparatus for preparing the agglomerated allium particles of our invention;

Fig. 5 is a diagrammatic side elevational view partly in section of another alternative form of apparatus for preparing the agglomerated allium particles of our invention; and Fig. 6 is an enlarged plan view of an agglomerated granule composed of fine powder particles of a dehydrated allium.

The flow diagram of Fig. 1 shows the essential steps of our process of forming porous or permeable aggregates from fine dehydrated allium powders including particularly garlic and onion powders. It is known that these dehydrated powders are hygroscopic and that they become somewhat self-adherent when subjected to moist air or to a fine spray of water or a fog of water such as produced by cooled steam. It is also known that these dehydrated allium powders, without the addition of moisture, become somewhat sticky and cohesive when heated slightly; that is, to temperatures in the range of about 130° to about 230° F. Either heating or moistening means for forming sticky surfaces on the allium powder may be employed as the first step in our process. The step of formation of adherent porous aggregates consists generally in putting the sticky powder particles in surface contact, as for example on a conveyor belt. The mass of particles may be agitated to form small clusters, or may be slightly compressed by any suitable means, such as by rolls, by pelletizing, or by forming into briquettes, using well-known equipment commonly employed for these purposes. The sticky condition of the agglomerated mass is overcome by cooling where the adhesiveness has been induced by the application of heat, or by drying, when moisture-induced stickiness has been employed. The final product consists of porous or permeable aggregates of the fine allium particles either of separate allium species or any desirable mixtures; for example, onion and garlic powder in any proportions. One such mixed product contained 10 percent garlic and 90 percent by weight of onion. The formed particles or granules may, if desired, be sized by conventional process steps with well known screening or sizing equipment.

In the specific process shown in the diagram of Fig. 2, as applied to dehydrated garlic powder and the formation of the desired porous or permeable aggregates or granules, the steps consist specifically in adding a fine spray or fog of water to produce surface stickiness, formation of aggregates of the sticky powdered garlic particles as previously described, the removal of the excess moisture by evaporation, followed by screening of the dry aggregated garlic product to remove either an oversize, or an undersize, or both, as desired.

In Fig. 3 is shown a preferred form of apparatus for preparing porous light weight aggregates from dehydrated allium powders. The apparatus consists essentially of a conveyor belt 11 operatively mounted on end pulleys 12 and 13 with idler pulleys 14 following conventional practice. Dehydrated allium powder is fed onto the top surface of the belt 11 from the feed hopper 15, being regulated by the discharge valve 16. A spray nozzle 17 for producing fine water spray is connected by a pipe 18 to a source of water, there being provided a control valve 19. A stirring means 20 is provided, the arms 21 being arranged to break up or agitate the layer of powder on the belt. The material on the belt is heated by means of radiant heaters 24 mounted above the belt. The amount of moisture added as spray or fog may be regulated so that the particles tend to stick together in clusters or aggregates, or alternatively no moisture need be added if the powder is subjected to a temperature which produces sufficient stickiness of the particles to cause them to adhere to each other in clusters. This tackifying temperature varies with the moisture content of the powder, as well as with the particular allium powder. In the case of onion powder containing 4.0 percent moisture, a temperature of 150° F. will produce clustering, whereas with onion powder containing 6.5 percent moisture, the clustering or aggregating temperature is 130° F. With garlic powder containing 6.5 percent moisture, the clustering or aggregating temperature is 230° F., and with 8.8 percent moisture, it is about 160° F.

The aggregated granules of allium powder are air cooled as they are discharged off the belt as it passes over the discharge pulley 13, a rotary brush 25 being provided to remove all of the material from the belt surface. The aggregated material is collected in the hopper 26 from which it flows over a shaker screen 27 into receiver drums 28 and 29.

The above described apparatus may be used for preparing porous garlic aggregates from dehydrated garlic powder, for example, as well as from the other commercial dehydrated allium powders, onion, chives, and leek.

Garlic is dehydrated commercially in large quantities. The process, generally, consists in slicing the cleaned bulbs, spreading the more or less broken slices in relatively thin layers on foraminous bottomed trays, and passing drying air through and over the layers until the moisture is reduced to about 6.5 percent by weight. At this low moisture content the dehydrated garlic is a nearly odorless stable, slightly hygroscopic material which may be pulverized by milling in hammer or roller mills, the finest powder being collected in dust collectors following well known practices in the pulverizing art. Dehydrated garlic powder is a slightly hygroscopic material which, in typical samples, all passes through a 60 mesh screen, about 25 percent is retained on a 100 mesh screen, about 20 percent passes through a 100 mesh screen and is retained on a 115 mesh screen, and about 55 percent passes through a 115 mesh screen. This powder may be used for flavoring large or small batches of food, but it has the defects that it is not free flowing, dusts badly when distributed through air (as in the operation of dispersing into a batch of food) and tends to form undispersed masses (lumps) which are only slowly wetted and distributed in the liquid phase of the food product being prepared, following normal stirring procedures.

Garlic powder prepared as above described may be formed into porous or permeable aggregates or granules by the use of the apparatus above described and following the described process steps. It is important that the moisture content of the aggregated product be quickly reduced to substantially the same dryness as the original powder in order to maintain stability against flavor deterioration, that is, for garlic, about 7 percent maximum moisture content.

The porous granular garlic product formed as above described has improved properties for food flavoring over the fine dehydrated garlic powder. Being composed of aggregates of fine powder, the flavoring of food batches is more effective because the garlic is more intimately distributed in the food batch because it does not cake and lump as fine powder does. Since the garlic is finely divided when the aggregates break up during the food mixing, the garlic aggregates are an improvement over the use of coarse garlic produced by coarse grinding of the dried garlic slices. The even distribution of the garlic flavoring material in use is greatly facilitated by the low bulk density of the aggregated product. For example, the bulk density of typical dehydrated garlic powder is about 130 milliliters per 100 grams, whereas the bulk density of the aggregated product was 246 milliliters per 100 grams in a typical example. The screen analysis of a typical sample of the aggregated product was 19 percent on 35 mesh, 21 percent through 35 mesh and remaining on 60 mesh, 36 percent through 60 mesh and remaining on 100 mesh, 4 percent through 100 mesh and on 115 mesh, and 20 percent through 115 mesh.

Onion is also dehydrated commercially in large quantities. The process is quite similar to that described above for garlic except that the onion product is dried to a maximum moisture content of about 4.5 percent, because at this degree of dehydration the onion material is stable, and the enzyme system which controls the odor and flavor is dormant. Dehydrated onion powder is produced by milling of the dried pieces, as described before for garlic. A typical dehydrated onion powder has a bulk density of 130 to 170 milliliters per 100 grams, and has a screen analysis of about 25 percent through 60 mesh and on 100 mesh, about 11 percent through 100 mesh and on 115 mesh, and about 64 percent through 115 mesh. After the forming of the onion powder into aggregates as above described, including drying to the original moisture content of the onion powder of about 4.5 percent, the bulk density was about 268 milliliters per 100 grams in a typical example, and the screen analysis showed 15 percent on 32 mesh, 9 percent through 32 mesh and on 35 mesh, 18 percent through 35 mesh and on 60 mesh, 34 percent through 60 mesh and on 100 mesh, 2 percent through 100 mesh and on 115 mesh, and 10 percent through 115 mesh.

The aggregates of dehydrated onion powder, as well as those of garlic and the other allium powders made in accordance with this invention, are stable not only as to physical form but are also stable against deterioration of flavoring strength since they have a moisture content below the maximum which may be tolerated to avoid activation of the enzyme system which liberates flavor and odor.

In Fig. 4 is shown diagrammatically an alternative form of apparatus which has been used to make the aggregates of dehydrated allium powders. The apparatus consists essentially of a slightly inclined horizontally disposed steel cylinder 32 mounted on rollers 33 for rotation on the horizontal axis. The inside of the cylinder is provided with elongated radial lifts 34 so that the dehydrated allium powder, which is fed into the upper end of the cylinder through the feed chute 35, is tumbled, showered and rolled as the cylinder rotates. A fine spray or fog of water is introduced into the cylinder near the feed end by means of the nozzle 36 at the end of the water supply pipe 37, there being a control valve 38 provided outside the cylinder for control of the admitted water. The moisture is adsorbed on the surfaces of the tumbling powder, which becomes slightly sticky and adherent, and "balls" or porous aggregates of the kind previously described form. A stream of hot dry air is admitted at the lower open end of the cylinder 32 through the dust 39, and the moisture which initiated the surface stickiness on the powder surfaces is removed, the aggregates becoming physically stable, and of low apparent density. The aggregated material is discharged into the hopper 26 from which it is distributed to the shaker screen 27 and the sized granular product is collected in drums 28 and 29.

Still another apparatus which may be used to make the porous aggregate form of dehydrated allium powder is shown diagrammatically in Fig. 5, in which the allium powder surfaces are moistened and aggregated while suspended in air. The device consists generally of a boxlike enclosure 41 into one end of which the dehydrated allium powder is introduced in a stream from the chute 42 of the hopper 43. The chute 42 is arranged so that the powder falls into a horizontally directed stream of dry hot air introduced through the duct 44 positioned below the chute 42, so that the steram of air disperses the powder and projects it forwardly into the enclosure 41. Immediately below the discharge end of the chute 42 there is positioned a water spray nozzle 45 which is connected to a water pipe 46, having a water control valve 47, whereby the falling powder is surface moistened before it is picked up by the hot dry air stream from the duct 44. Thed ried clusters of allium powder drop into the hopper bottom 48 of the enclosure 41, and the porous aggregated material is removed through the gate 49.

Any powdered material which is not agglomerated is separated from the air by the separator 50 which receives the air and powder through the outlet pipe 51, and the collected powder may be recovered and recycled if desired.

The product of the above described processes consists of clusters or porous aggregates of the allium powder which typically appear somewhat as represented in the enlarged plan view of Fig. 6. The product has greater bulk per unit weight than the dehydrated allium powder from which it is made, usually being about twice the volume for a given weight. The material is coarser and therefore much easier to distribute in moist food batches because it does not cake or form undispersed "lumps" and does not "dust" when distributed into food. Because the original powders are finely ground, blending for uniformity of slightly different batches is more easily effected, and off-color specks are obscured when the clusters or aggregated powder is provided. Mixtures of onion and garlic powders in stabilized clusters may be produced in a form which does not segregate in packages or dispensers.

We claim:

1. A method of producing porous aggregates from powdered dehydrated allium particles which comprises the steps of tackifying the surfaces of said powdered allium particles, disposing adjacent tacky surfaced particles in contact whereby to form clusters, and destroying the tackiness on said clustered particles to produce stable open porous aggregates of said powdered dehydrated allium particles.

2. The method of producing porous aggregates from powdered dehydrated allium particles which comprises heating said particles until their surfaces become tacky, forming clusters of said tacified particles, and cooling said clusters whereby to produce stable open porous aggregates of said powdered allium particles.

3. The method of producing porous aggregates from powdered dehydrated allium particles which comprises moistening the surfaces of said powder particles with a solvent utnil surface tackiness is produced, forming clusters of said tackified allium particles, and evaporating off said solvent whereby to produce stable open porous aggregates of said allium particles.

4. The method of producing porous aggregates from powdered dehydrated allium particles which comprises moistening the surfaces of said particles with water until surface tackiness is produced, forming clusters of said tackified allium particles, and evaporating off said water whereby to produce stable open porous aggregates of said allium particles.

5. The method of producing porous aggregates from powdered dehydrated allium particles which comprises moistening the surfaces of said particles with water until surface tackiness is produced, rolling and tumbling said moistened particles until adherent clusters of particles are formed, and then evaporating off said added water whereby to produce stable open porous aggregates of said allium particles.

6. The method of producing porous aggregates from powdered dehydrated allium particles which comprises producing a stream of closely adjacent dehydrated powdered allium particles, wetting said particles by directing a stream of finely divided water particles into said stream of allium particles while they are close together for tackifying the surfaces of said allium particles thereby forming clusters, and then drying the excess moisture from said clusters by contacting them with a stream of dry warm air, whereby to form stable porous aggregates of low apparent density.

7. The method of claim 1 in which the powdered dehydrated allium is garlic.

8. The method of claim 1 in which the powdered dehydrated allium is onion.

9. The method of claim 4 in which the powdered dehydrated allium is garlic, and the moisture content of the porous aggregate is not greater than about 7 percent.

10. The method of claim 4 in which the powdered dehydrated allium is onion, and the moisture content of the porous aggregate is not greater than about 4.5 percent.

11. As a new article of commerce, aggregates of finely powdered dehydrated onion, the individual powder particles being fused at their contacts with adjoining particles to form mechanically stable non-dusting and non-caking granular particles.

12. Aggregated granules of dehydrated natural allium powder particles, each of said powder particles being firmly attached to at least one adjoining particle to form clusters of an open porous structure, said granules being characterized by being free-flowing, non-dusting, having greater bulk density than the original powder, and retaining unimpaired substantially all of the flavoring properties of the original allium powder.

13. Aggregated granules of dehydrated natural allium powder particles, each of said allium powder particles being heat-fused to at least one adjoining particle to form clusters of an open porous structure, said granules being characterized by being free-flowing, non-dusting, having greater bulk density than the original powder, and retaining unimpaired substantially all of the flavoring properties of the original allium powder.

14. Aggregated granules of dehydrated natural garlic powder particles, each of said garlic powder particles being firmly attached to at least one adjoining particle to form clusters of an open porous structure, said granules being characterized by being free-flowing, non-dusting, having greater bulk density than the original powder, and retaining unimpaired substantially all of the flavoring properties of the original garlic powder.

15. Aggregated granules of dehydrated natural onion powder particles, each of said onion powder particles being firmly attached to at least one adjoining particle to form clusters of an open porous structure, said granules being characterized by being free-flowing, non-dusting, having greater bulk density than the original powder, and retaining unimpaired substantially all of the flavoring properties of the original onion powder.

16. Aggregated granules of dehydrated natural onion powder particles, characterized by being non-dusting and non-caking, and having a moisture content not greater than about 4.5 percent (bone-dry basis), whereby the flavor enzyme system in said particles remains dormant.

17. Aggregated granules of dehydrated natural garlic powder particles, characterized by being non-dusting and non-caking, and having a moisture content not greater than about 7 percent (bone-dry basis), whereby the flavor enzyme system in said particles remains dormant.

References Cited in the file of this patent

UNITED STATES PATENTS

| | | |
|---|---|---|
| 1,038,334 | Fleck | Sept. 10, 1912 |
| 1,155,977 | Vernon | Oct. 5, 1915 |
| 2,019,363 | Schulz | Oct. 29, 1935 |
| 2,856,290 | Peebles | Oct. 14, 1958 |